United States Patent
Liu

(10) Patent No.: US 10,831,740 B2
(45) Date of Patent: Nov. 10, 2020

(54) PARALLEL PROCESSING OF SERVICE DATA CORRESPONDING TO MULTIPLE TARGET OBJECTS

(71) Applicant: Alibaba Group Holding Limited, George Town (KY)

(72) Inventor: Lindong Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/426,928

(22) Filed: May 30, 2019

(65) Prior Publication Data

US 2019/0278761 A1     Sep. 12, 2019

Related U.S. Application Data

(63) Continuation of application No. PCT/CN2017/112588, filed on Nov. 23, 2017.

(30) Foreign Application Priority Data

Nov. 30, 2016   (CN) .......................... 2016 1 1077603

(51) Int. Cl.
*G06F 16/23* (2019.01)
*G06Q 20/10* (2012.01)
*G06Q 20/42* (2012.01)

(52) U.S. Cl.
CPC .......... *G06F 16/23* (2019.01); *G06Q 20/102* (2013.01); *G06Q 20/42* (2013.01)

(58) Field of Classification Search
None
See application file for complete search history.

(56) References Cited

U.S. PATENT DOCUMENTS 7,353,203 B1 *  4/2008  Kriplani ................. G06Q 20/02
                                                        705/39
8,660,911 B2 *  2/2014  Hirson ................... G06Q 20/12
                                                        705/26.1

(Continued)

FOREIGN PATENT DOCUMENTS

CN         101079133        11/2007
CN         101441751         5/2009

(Continued)

OTHER PUBLICATIONS

PCT International Preliminary Report on Patentability in International Application No. PCT/CN2017/112588, dated Jun. 4, 2019, 9 pages (with English Translation).

(Continued)

*Primary Examiner* — Uyen T Le
(74) *Attorney, Agent, or Firm* — Fish & Richardson P.C.

(57) ABSTRACT

Implementations of the present disclosure include methods, apparatuses, and client devices for processing service data. Target data and target objects associated with a service item are determined. Service data associated with the target data is received from the plurality of target objects. For service data that was received within a predetermined time period, labeled data including the service data and a confirmation label is generated. An option to process the labeled data associated with the plurality of target objects in parallel is provided by a confirmation interface. In response to receiving a user input confirming parallel processing of the labeled data, completing service processing for the target objects.

20 Claims, 14 Drawing Sheets

(56) References Cited

U.S. PATENT DOCUMENTS

| | | | | |
|---|---|---|---|---|
| 8,751,387 | B2* | 6/2014 | Hougland | G06Q 20/10 |
| | | | | 705/40 |
| 8,965,798 | B1* | 2/2015 | MacKrell | G06Q 30/04 |
| | | | | 705/30 |
| 2002/0120567 | A1* | 8/2002 | Caplan | G07F 17/0014 |
| | | | | 705/40 |
| 2010/0049794 | A1 | 2/2010 | Shi | |
| 2010/0306015 | A1* | 12/2010 | Kingston | G06Q 10/1093 |
| | | | | 705/7.18 |
| 2013/0085931 | A1 | 4/2013 | Runyan | |
| 2014/0279446 | A1 | 9/2014 | Dorsey et al. | |
| 2014/0344092 | A1* | 11/2014 | Clibanoff | G06Q 20/102 |
| | | | | 705/26.2 |
| 2015/0111530 | A1 | 4/2015 | Li | |
| 2015/0142661 | A1* | 5/2015 | Jain | G06Q 40/00 |
| | | | | 705/44 |
| 2015/0356470 | A1 | 12/2015 | Mitchell | |
| 2016/0034865 | A1 | 2/2016 | Henry et al. | |
| 2016/0117651 | A1* | 4/2016 | Davis | G06Q 20/3255 |
| | | | | 705/40 |
| 2016/0321624 | A1* | 11/2016 | Brunner | H04W 4/14 |
| 2016/0364705 | A1* | 12/2016 | Bedier | G06Q 20/382 |
| 2018/0315029 | A1* | 11/2018 | Kim | G06Q 40/02 |

FOREIGN PATENT DOCUMENTS

| | | |
|---|---|---|
| CN | 104753906 | 7/2015 |
| CN | 104766208 | 7/2015 |
| CN | 104933558 | 9/2015 |
| CN | 105262674 | 1/2016 |
| CN | 105631653 | 6/2016 |
| CN | 105719135 | 6/2016 |
| CN | 105787720 | 7/2016 |
| CN | 105913244 | 8/2016 |
| CN | 107038561 | 8/2017 |
| EP | 3016050 | 5/2016 |
| JP | 2003036381 | 2/2003 |
| JP | 2013200811 | 10/2013 |
| JP | 2013246710 | 12/2013 |
| JP | 2015153262 | 8/2015 |
| TW | M364923 | 9/2009 |
| WO | WO 2014103487 | 7/2014 |
| WO | WO 2015067017 | 5/2015 |

OTHER PUBLICATIONS

PCT International Search Report and Written Opinion in International Application No. PCT/CN2017/112588, dated Feb. 28, 2018, 13 pages (with English Translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 17876550.9, dated Oct. 31, 2019, 10 pages.

* cited by examiner

PARALLEL PROCESSING OF SERVICE DATA CORRESPONDING TO MULTIPLE TARGET OBJECTS

CROSS-REFERENCE TO RELATED APPLICATIONS

This application is a continuation of PCT Application No. PCT/CN2017/112588, filed on Nov. 23, 2017, which claims priority to Chinese Patent Application No. 201611077603.7, filed on Nov. 30, 2016, and each application is hereby incorporated by reference in its entirety.

TECHNICAL FIELD

The present application relates to the field of computer and Internet technologies, and in particular, to methods, apparatuses, and client devices for processing service data.

BACKGROUND

With the development of electronic technologies and Internet technologies, functions of electronic devices (especially intelligent mobile devices) become more powerful, and the electronic devices can complete various transactions provided that users install various application programs on the electronic devices based on demands of the users.

With the rapid development of intelligent mobile devices, more users choose mobile payments in their daily life. Currently, main modes of mobile payment include a transfer mode, a collection mode, etc. The collection mode includes a mode in which a user collects money from one or more users. Specifically, for example, user A (a receiver) needs to collect money from user B (a payer) and user C (a payer), and user A can initiate a request message of a collection service to corresponding payers: user B and user C. Then, user B and user C enter a payment interface corresponding to the collection service based on the request message, to perform payment and complete the collection service. It can be seen that, in the previously described collection mode, a payer needs to enter a corresponding payment interface based on a request message of a collection service sent by a receiver to complete the collection service.

However, in the existing technology, a payer may directly perform payment in a transfer mode when a request message of a collection service is not received in a timely manner. In this case, the payer does not enter a payment page of the corresponding collection service to perform payment. As a result, the collection service is an ongoing service item that is to be processed. Consequently, server resources are wasted, server processing speed is affected, and user experience is reduced.

SUMMARY

An objective of implementations of the present application is to provide methods, apparatuses, and client devices for processing service data, to help a user complete a service item that is to be processed, and further release server resources, accelerate server processing speed, and improve user experience.

To alleviate the previously described technical problems, the implementations of the present application are implemented as follows:

A method for processing service data is provided, including: determining target data of a service item that is to be processed; querying whether received data associated with the target data exists within a predetermined time period; when a determining result is yes, setting a first to-be-confirmed label for the received data associated with the target data; and displaying a first message confirmation interface, where the first message confirmation interface includes a confirmation message about whether to combine the received data that has the first to-be-confirmed label into the corresponding service item that is to be processed.

A method for processing service data is provided, including: determining a target object of a service item that is to be processed; querying whether received data sent by the target object exists within a predetermined time period; when a determining result is yes, setting a second to-be-confirmed label for the received data sent by the target object; and displaying a second message confirmation interface, where the second message confirmation interface includes a confirmation message about whether to combine the received data that has the second to-be-confirmed label into the corresponding service item that is to be processed.

An apparatus for processing service data is provided, including: a target data determining module, configured to determine target data of a service item that is to be processed; a first querying module, configured to query whether received data associated with the target data exists within a predetermined time period; a first label setting module, configured to set a first to-be-confirmed label for the received data associated with the target data when a result determined by the first querying module is yes; and a first confirmation message display module, configured to display a first message confirmation interface, where the first message confirmation interface includes a confirmation message about whether to combine the received data that has the first to-be-confirmed label into the corresponding service item that is to be processed.

An apparatus for processing service data is provided, including: a target object determining module, configured to determine a target object of a service item that is to be processed; a second querying module, configured to query whether received data sent by the target object exists within a predetermined time period; a second label setting module, configured to set a second to-be-confirmed label for the received data sent by the target object when a result determined by the second querying module is yes; and a second confirmation message display module, configured to display a second message confirmation interface, where the second message confirmation interface includes a confirmation message about whether to combine the received data that has the second to-be-confirmed label into the corresponding service item that is to be processed.

A client, including: at least one processor; a memory storing programmed instructions, where the programmed instructions, when executed by the at least one processor, instruct the at least one processor to determine target data of a service item that is to be processed, query whether received data associated with the target data exists within a predetermined time period, set a first to-be-confirmed label for the received data associated with the target data when a determining result is yes, and send an instruction for displaying a first message confirmation interface, where the first message confirmation interface includes a confirmation message about whether to combine the received data that has the first to-be-confirmed label into the corresponding service item that is to be processed; and a display unit, coupled to the at least one processor, configured to display the first message confirmation interface, where the first message confirmation interface includes the confirmation message about whether to combine the received data that has the first to-be-confirmed label into the corresponding service item that is to be processed.

A client, including: at least one processor; a memory storing programmed instructions, wherein the programmed instructions, when executed by the at least one processor, instruct the at least one processor to determine a target object of a service item that is to be processed, query whether received data sent by the target object exists within a predetermined time period, set a second to-be-confirmed label for the received data sent by the target object when a determining result is yes, and send an instruction for displaying a second message confirmation interface, where the second message confirmation interface includes a confirmation message about whether to combine the received data that has the second to-be-confirmed label into the corresponding service item that is to be processed; and a display unit, coupled to the at least one processor, configured to display the second message confirmation interface, where the second message confirmation interface includes the confirmation message about whether to combine the received data that has the second to-be-confirmed label into the corresponding service item that is to be processed.

It can be learned from the technical solutions provided in the implementations of the present application that, in the implementations of the present application, whether the received data associated with obtained target data of the service item that is to be processed exists within the predetermined time period is determined, the label that is to be confirmed and that is in a one-to-one correspondence with the corresponding service item that is to be processed is set for the received data associated with the target data, and then the confirmation message about whether to combine the received data that has the label that is to be confirmed into the corresponding service item that is to be processed is displayed to help a user complete the service item that is to be processed. Further, a case in which a user performs service processing in another way instead of entering a service data payment processing interface can be effectively alleviated. Compared with the existing technology, the technical solutions provided in the implementations of the present application can help a user complete a service item that is to be processed, and can further release server resources, accelerate server processing speed, and improve user experience.

BRIEF DESCRIPTION OF DRAWINGS

To describe the technical solutions in the implementations of the present application or in the existing technology more clearly, the following briefly describes the accompanying drawings needed for describing the implementations or the existing technology. Apparently, the accompanying drawings in the following description merely show some implementations, and a person of ordinary skill in the art can still derive other drawings from these accompanying drawings without creative efforts.

DESCRIPTION OF IMPLEMENTATIONS

Implementations of the present application provide methods, apparatuses, and client devices for processing service data.

Technical carriers related to payment in the implementations of the present application can include, for example, Near Field Communication (NFC), Wireless Fidelity (WiFi), 3G/4G/5G, a technology of swiping card by using a point of sale (POS) machine, a quick response code scanning technology, a bar code scanning technology, Bluetooth, infrared, a short message service (SMS), and a multimedia messaging service (MMS).

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Specific implementation of the implementations of the present application is described in detail below by using several specific examples.

Figure 1:
FIG. 1 is a schematic flowchart illustrating an implementation of a method for processing service data, according to the present application.

The following first describes an implementation of a method for processing service data according to the present application. FIG. 1 is a schematic flowchart illustrating an implementation of a method for processing service data, according to the present application. Although the present application provides the operation steps of the method described in the implementation or flowchart, the method can include more or fewer operation steps based on a conventional or non-creative effort. A sequence of the steps listed in the implementation is merely one of numerous execution sequences of the steps, and does not represent a unique execution sequence. In actual execution of an apparatus or a client product, execution can be performed based on the method sequence shown in the implementation or the accompanying drawing, or performed in parallel (e.g., a parallel processor or a multi-thread processing environment). Specifically, as shown in FIG. 1, the method can include the following steps.

S110: Determine target data of a service item that is to be processed.

In the present implementation of the present application, the target data of the service item that is to be processed can include funds, or can include other virtual objects, such as bonus points. Generally, the target data can include one or more pieces of data. In a specific implementation, for example, the service item that is to be processed is an ongoing collection service. Assume that user A, user B, user C, and user D spend a total of 107 RMB on an AA dinner, and the payment is first made by user A. Then, user A can initiate a collection service. Correspondingly, target data of the collection service here is funds, and includes one piece of data: 26.75 RMB. In another specific implementation, assume that user E purchases articles for user X, user Y, and user Z, and the value of user X's articles and the value of user Y's articles are each at 200 RMB, and articles of user Z are valued at 300 RMB. Correspondingly, user E can set two pieces of target data when initiating a collection service: 200 RMB and 300 RMB. Correspondingly, user X, user Y, and user Z can select a corresponding amount to complete payment.

Figure 2:
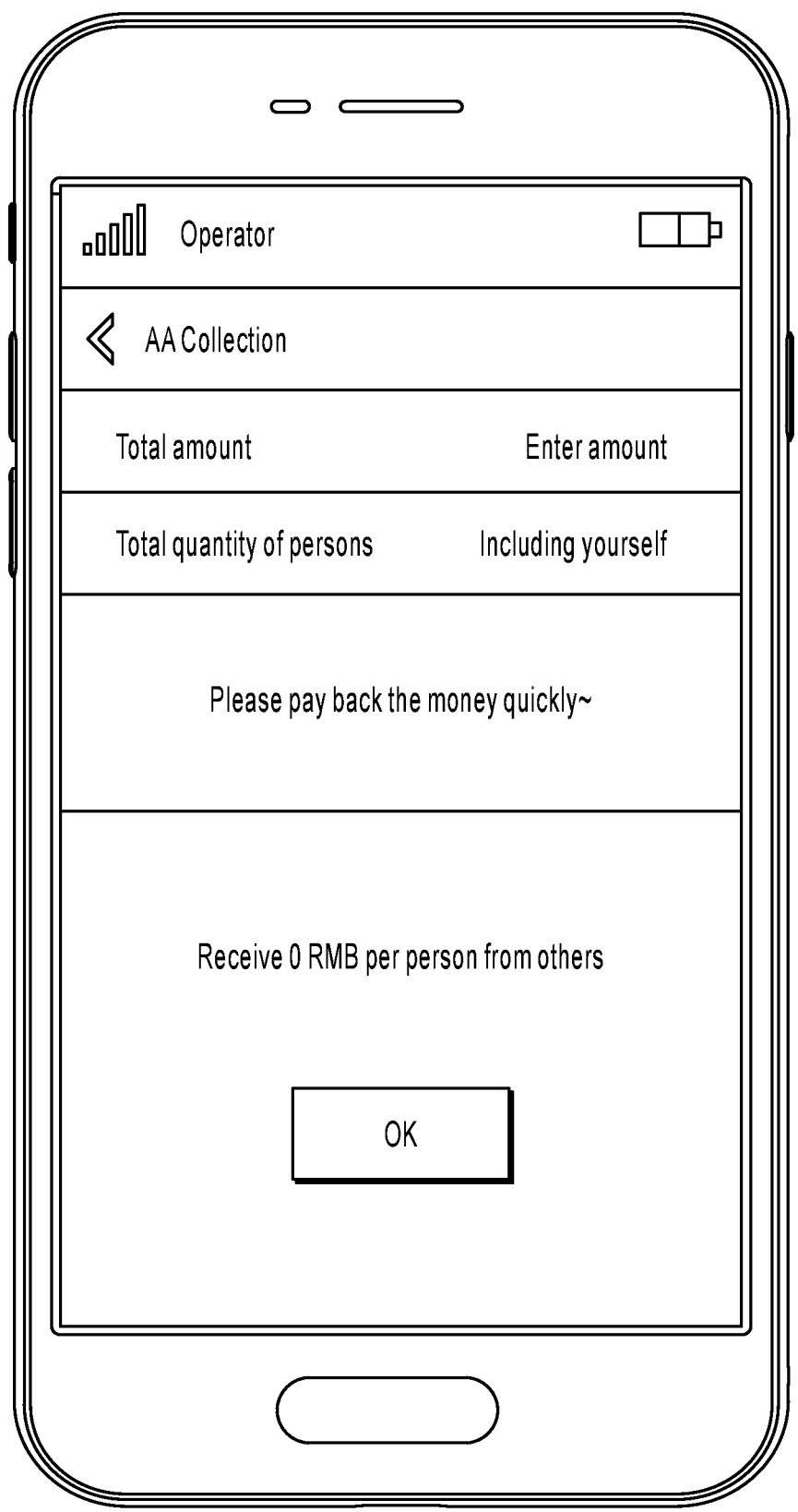
FIG. 2 is a schematic diagram illustrating an initiation page of an implementation in which a smartphone accesses an application program that has a collection function to perform a collection service, according to the present application.

In the present implementation, for example, an application program that has a collection function is installed in a smartphone. With reference to the previous implementation in which user A, user B, user C, and user D spend a total of 107 RMB on an AA dinner, FIG. 2 is a schematic diagram illustrating an initiation page of an implementation in which a smartphone accesses an application program that has a collection function to perform a collection service, according to the present application. After tapping a trigger button that has an AA collection function in a corresponding application program, user A can enter the initiation page of the collection service shown in FIG. 2, enter 107 in a total amount and 4 in a total quantity of persons, and tap OK to initiate the collection service. Correspondingly, a server can determine corresponding target data by using the total amount and the total quantity of persons that are entered. Then, user A can send a request message of the collection service to the corresponding payers: user B, user C, and user D.

In addition, it is worthwhile to note that the initiation page in the implementations of the present application is not limited to the form in FIG. 2, and can further include another form with reference to actual application situations, for example, a form of directly entering target data and a total quantity of persons. Implementations are not limited in the implementations of the present application.

Figure 3:
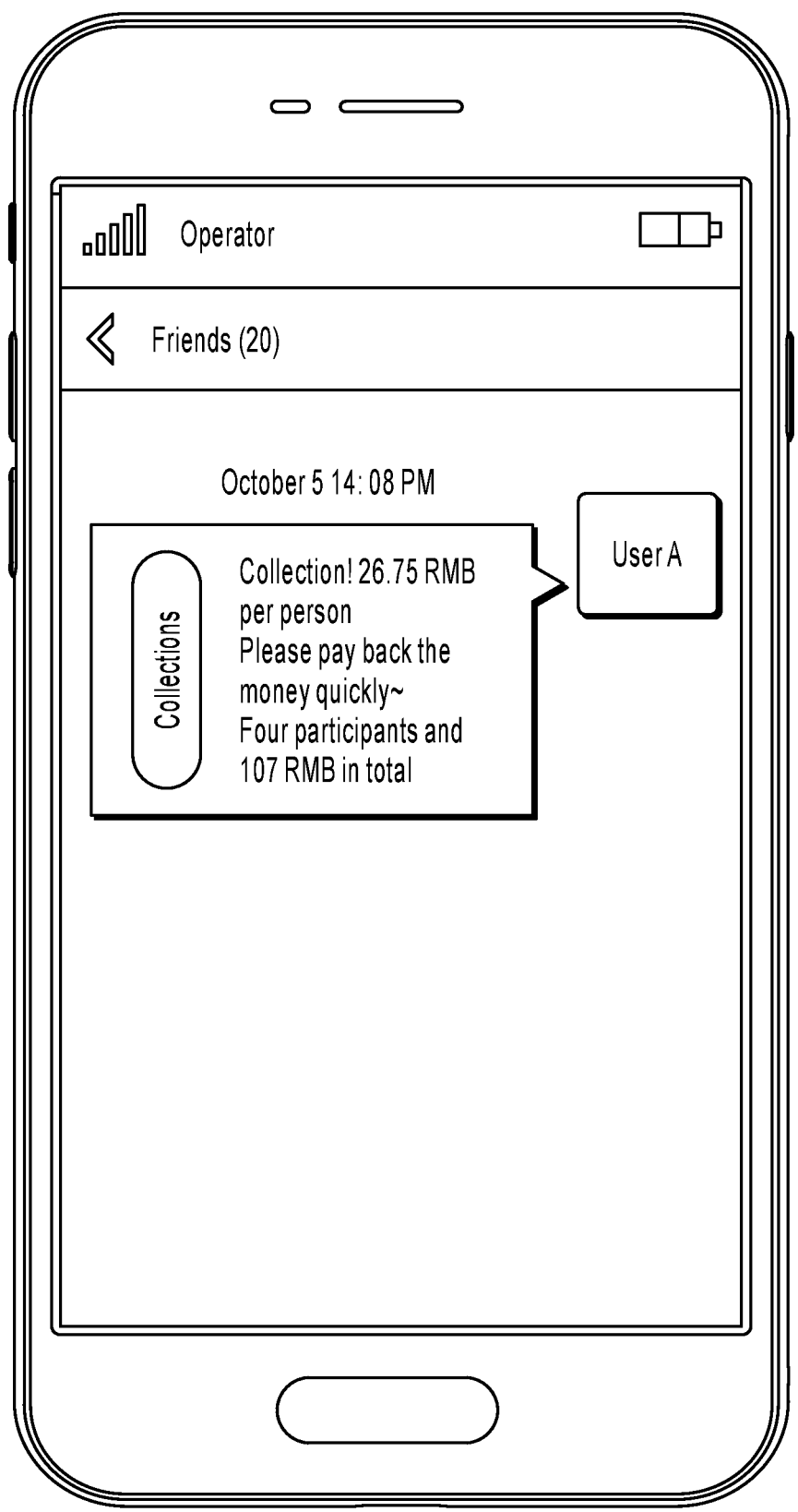
FIG. 3 is a schematic diagram illustrating a page of an implementation after a request message of a collection service is sent, according to the present application.

FIG. 3 is a schematic diagram illustrating a page of an implementation after a request message of a collection service is sent, according to the present application. It can be seen from FIG. 3 that user A sends a request message in a group, and the group can usually include at least one payer. In addition, the request message in the implementations of the present application can be sent in a group that includes a payer to notify the payer of the payment, or can be directly sent to a corresponding payer. Implementations are not limited in the implementations of the present application.

S120: Query whether received data associated with the target data exists within a predetermined time period.

In the present implementation of the present application, after the target data of the service item that is to be processed is determined, whether the received data associated with the target data exists within the predetermined time period can be queried. Specifically, the predetermined time period can include a time period predetermined based on a generation time of the service item that is to be processed. The predetermined time period can include the generation time of the service item that is to be processed, or may not include the generation time of the service item that is to be processed. Specifically, the predetermined time period can include at least one of the following setting methods: a first time period before the generation time of the service item that is to be processed; a second time period after the generation time of the service item that is to be processed; a third time period before the generation time of the service item that is to be processed; or a fourth time period after the generation time of the service item that is to be processed.

Specifically, specific values can be set for the first time period, the second time period, the third time period, and the fourth time period with reference to actual application situations. The third time period can be the same as the fourth time period, or can be different from the fourth time period.

In a specific implementation, the received data can include received transfer information, etc. For example, user X transfers 200 RMB to you. Specifically, the received data associated with the target data can include at least one of the following: received data whose difference from the target data is less than or equal to a predetermined threshold; or received data that is in a multiple relationship with the target data.

In some implementations, a collection service is used as an example. Assume that the target data is 25.88 RMB, and a payer may directly transfer 26 RMB for ease of transfer convenience. Correspondingly, the transfer can be included in the received data associated with the target data by setting the predetermined threshold here. Specifically, the predetermined threshold can be predetermined based on a type of the target data and actual application situations. For example, when the target data is funds, the predetermined threshold can be set to 1 RMB. When the target data is bonus points, the predetermined threshold can be set to 10 bonus points. Implementations are not limited in the implementations of the present application.

Figure 4:
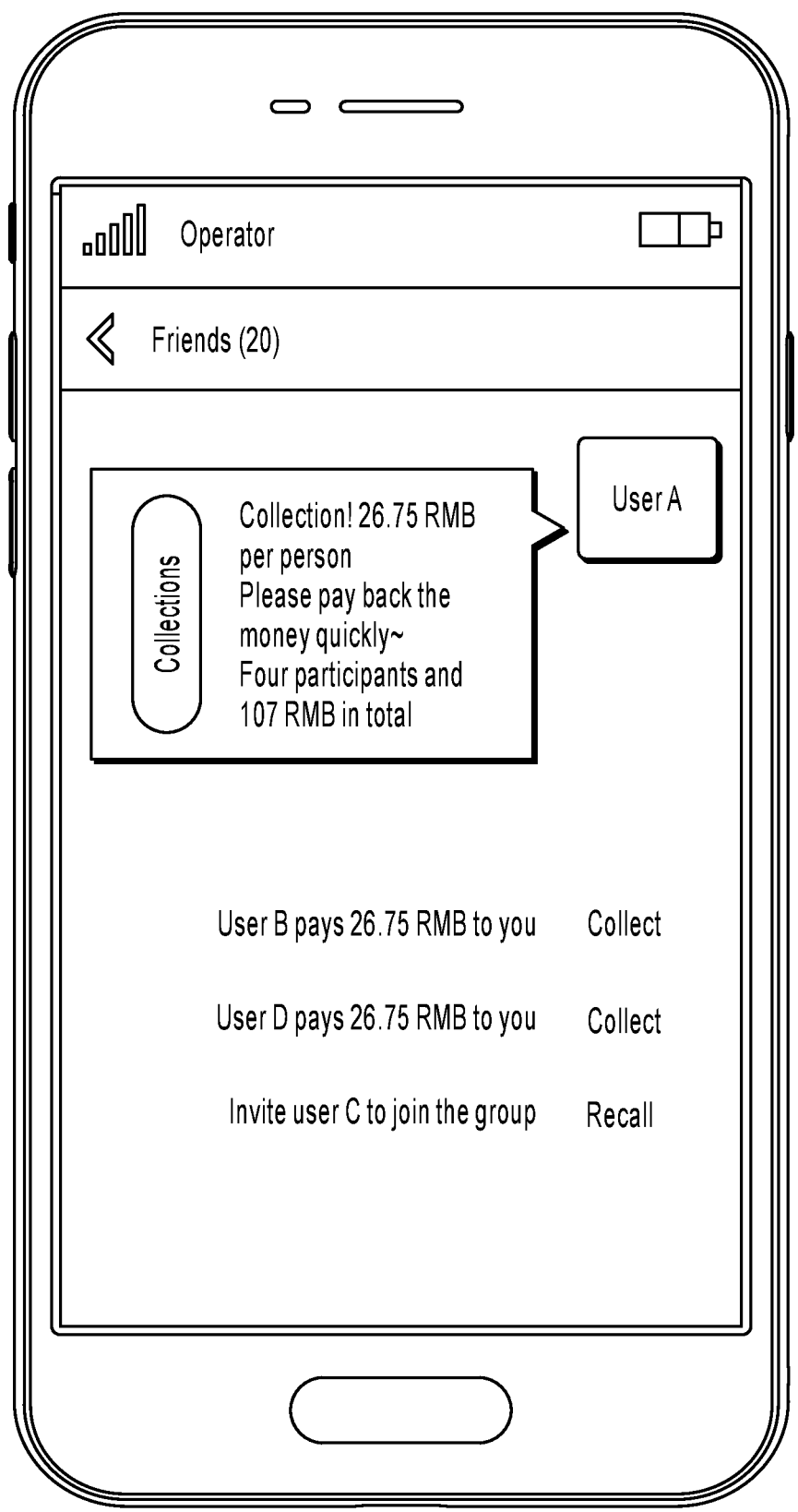
FIG. 4 is a schematic diagram illustrating a scenario of an implementation after a request message of a collection service is sent, according to the present application.

In practice, with reference to the previously described implementation of AA dinner, FIG. 4 is a schematic diagram illustrating a scenario of an implementation after a request message of a collection service is sent, according to the present application. It can be seen that user B and user D are in a group in which user A sends a request message of a collection service, and user B and user D enter a corresponding payment interface for payment by using the request message sent by user A, but user C is not in the group in which user A sends the request message of the collection service at first. As a result, user C does not receive, in a timely manner, the request message of the collection service initiated by user A. Assume that user C chooses to directly transfer a corresponding amount of money to user A, and directly transfer 27 RMB to user A for ease of transfer convenience. In this case, by querying whether the received data associated with target data exists within the predetermined time period, it can be found that information that user C transfers 27 RMB to user A is the received data associated with the target data 26.75 RMB.

In another implementation, a collection service is used as an example. One payer may perform payment for a plurality of payers. Correspondingly, the received data associated with the target data can include the received data that is in a multiple relationship with the target data. In addition, it is worthwhile to note that the received data associated with the target data in the implementations of the present application is not limited to the previously described cases. In practice, another piece of data can be further included, and implementations are not limited in the implementations of the present application.

S130: When a determining result is yes, set a first to-be-confirmed label for the received data associated with the target data.

In the present implementation of the present application, when the determining result in step S120 is yes, the first to-be-confirmed label can be set for the received data associated with the target data. Specifically, the first to-be-confirmed label can include predetermined labels that are in a one-to-one correspondence with corresponding service items that are to be processed.

In a specific implementation, with reference to the previously described implementation of AA dinner, the first to-be-confirmed label that corresponds to the collection service that can be initiated by user A for the previously described AA dinner can be set for the information that user C transfers 27 RMB to user A.

S140: Display a first message confirmation interface, where the first message confirmation interface includes a confirmation message about whether to combine the received data that has the first to-be-confirmed label into the corresponding service item that is to be processed.

In the present implementation of the present application, after the first to-be-confirmed label is set for the received data associated with the target data, the first message confirmation interface can be displayed. The first message confirmation interface includes the confirmation message about whether to combine the received data that has the first to-be-confirmed label into the corresponding service item that is to be processed. Specifically, the first message confirmation interface can include an interface that is predetermined based on the confirmation message about whether to combine the received data that has the first to-be-confirmed label into the corresponding service item that is to be processed.

In some implementations, before the displaying a first message confirmation interface, the method can further include the following: monitoring whether there is an operation instruction for entering a processing interface of the service item that is to be processed, and in response to detecting the operation instruction for entering the processing interface of the service item that is to be processed, displaying the first message confirmation interface, where the first message confirmation interface includes the confirmation message about whether to combine the received data that has the first to-be-confirmed label into the corresponding service item that is to be processed.

Figure 5:
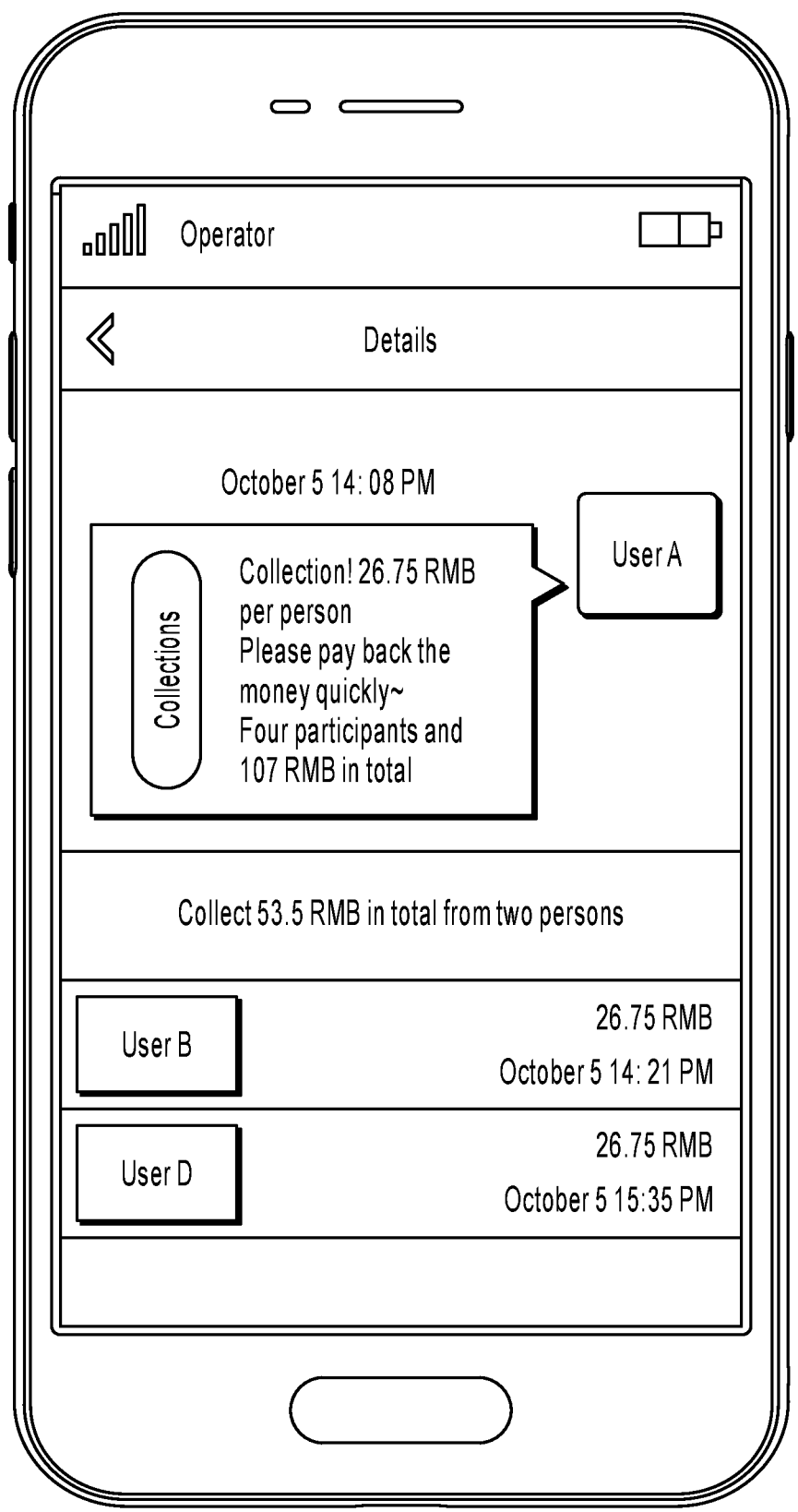
FIG. 5 is a schematic diagram illustrating an implementation of a processing page of a collection service, according to the present application.

FIG. 5 is a schematic diagram illustrating an implementation of a processing page of a collection service, according to the present application. It can be seen from FIG. 5 that a user can obtain data of a current progress of a collection service.

Figure 6:
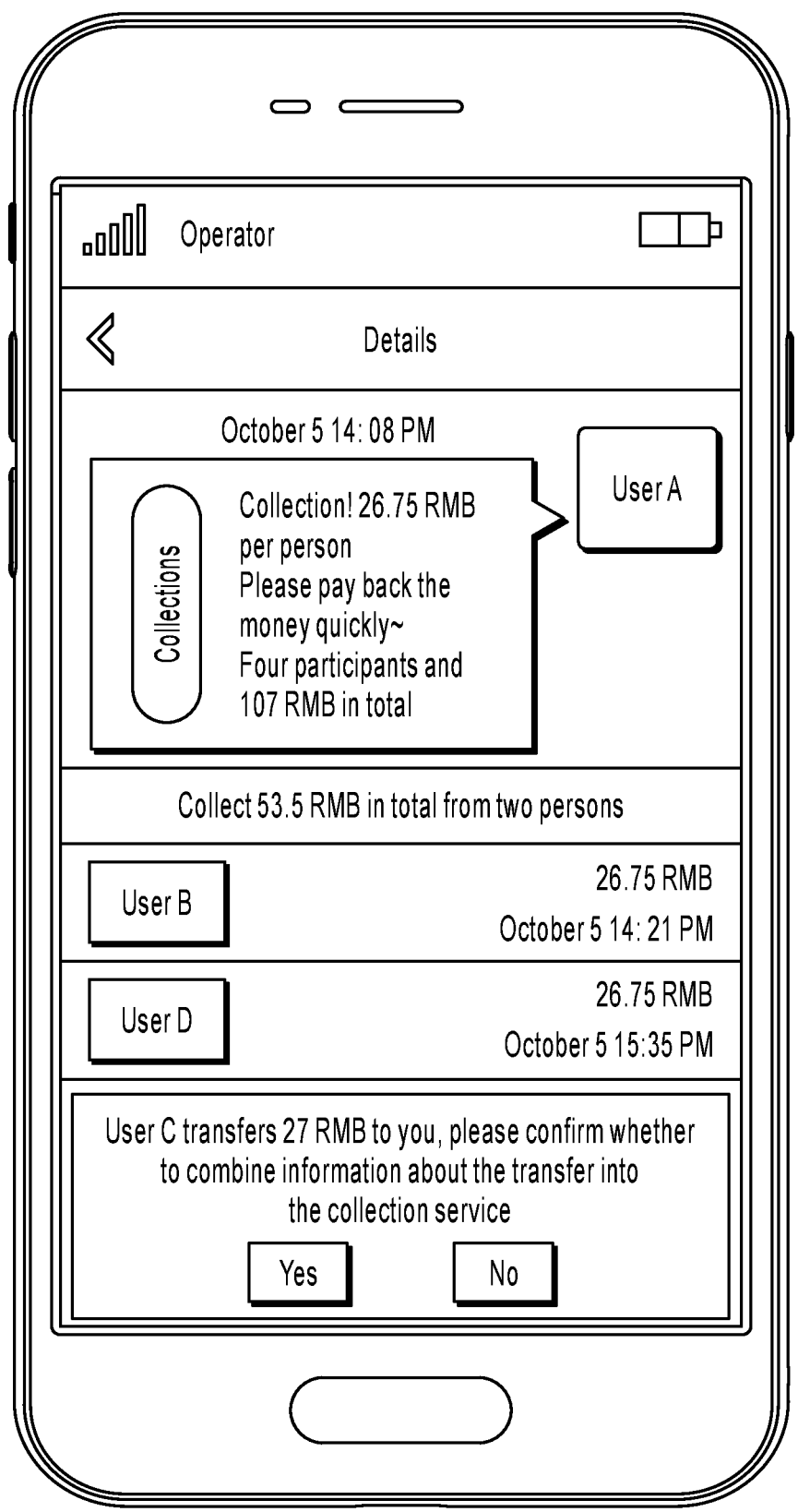
FIG. 6 is a schematic diagram illustrating an implementation of displaying a first message confirmation interface in a processing page of a collection service, according to the present application.

In a specific implementation, with reference to the previously described implementation of AA dinner, when it is detected that user A enters a processing interface of the collection service, a confirmation message indicating that user C transfers 27 RMB to you and whether to combine the information about the transfer into the collection service is displayed. Correspondingly, the user can determine, based on the confirmation message and the current progress of the collection service, whether to combine the data into the collection service, and can further help user A complete the service item that is to be processed. FIG. 6 is a schematic diagram illustrating an implementation of displaying a first message confirmation interface in a processing page of a collection service, according to the present application.

In addition, it is worthwhile to note that a page displaying the first message confirmation interface in the implementations of the present application is not limited to a form of the processing page of the collection service in FIG. 6, and can further include another form with reference to actual application situations. Implementations are not limited in the implementations of the present application.

In some implementations, the method can further include the following: when an execution result of the confirmation message is yes, combining the received data that has the first to-be-confirmed label into the service item that is to be processed.

Correspondingly, in some implementations, the method can further include the following: when an execution result of the confirmation message is no, removing the label from the received data that has the first to-be-confirmed label.

Specifically, the label removal processing can include removing the first to-be-confirmed label.

It can be learned from the implementation of the method for processing service data in the present application that, in the present application, whether the received data associated with obtained target data of the service item that is to be processed exists within the predetermined time period is determined, the first to-be-confirmed label that is in a one-to-one correspondence with the corresponding service item that is to be processed is set for the received data associated with the target data, and then the first message confirmation interface that includes the confirmation message about whether to combine the received data that has the first to-be-confirmed label into the corresponding service item that is to be processed is displayed to help a user complete the service item that is to be processed. Further, a case in which a user performs service processing in another way instead of entering a service data payment processing interface can be effectively alleviated. Compared with the existing technology, the technical solutions provided in the implementations of the present application can help a user complete a service item that is to be processed, and can further release server resources, accelerate server processing speed, and improve user experience.

Figure 7:
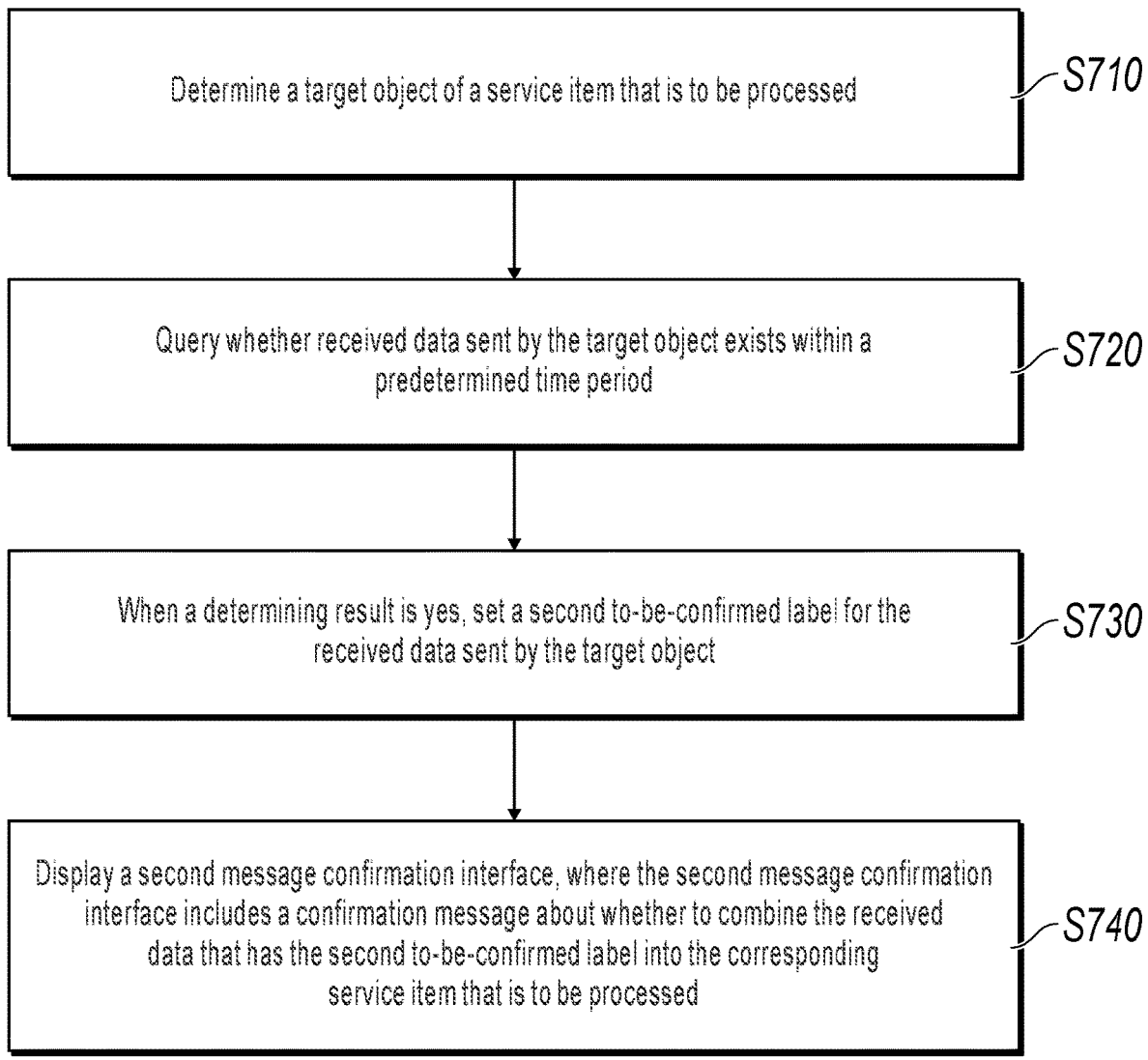
FIG. 7 is a schematic flowchart illustrating another implementation of a method for processing service data, according to the present application.

The following describes another implementation of a method for processing service data according to the present application. FIG. 7 is a schematic flowchart illustrating another implementation of a method for processing service data, according to the present application. Although the present application provides the operation steps of the method described in the implementation or flowchart, the method can include more or fewer operation steps based on a conventional or non-creative effort. A sequence of the steps listed in the implementation is merely one of numerous execution sequences of the steps, and does not represent a unique execution sequence. In actual execution of an apparatus or a client product, execution can be performed based on the method sequence shown in the implementation or the accompanying drawing, or performed in parallel (e.g., a parallel processor or a multi-thread processing environment). Specifically, as shown in FIG. 7, the method can include the following steps.

S710: Determine a target object of a service item that is to be processed.

Figure 8:
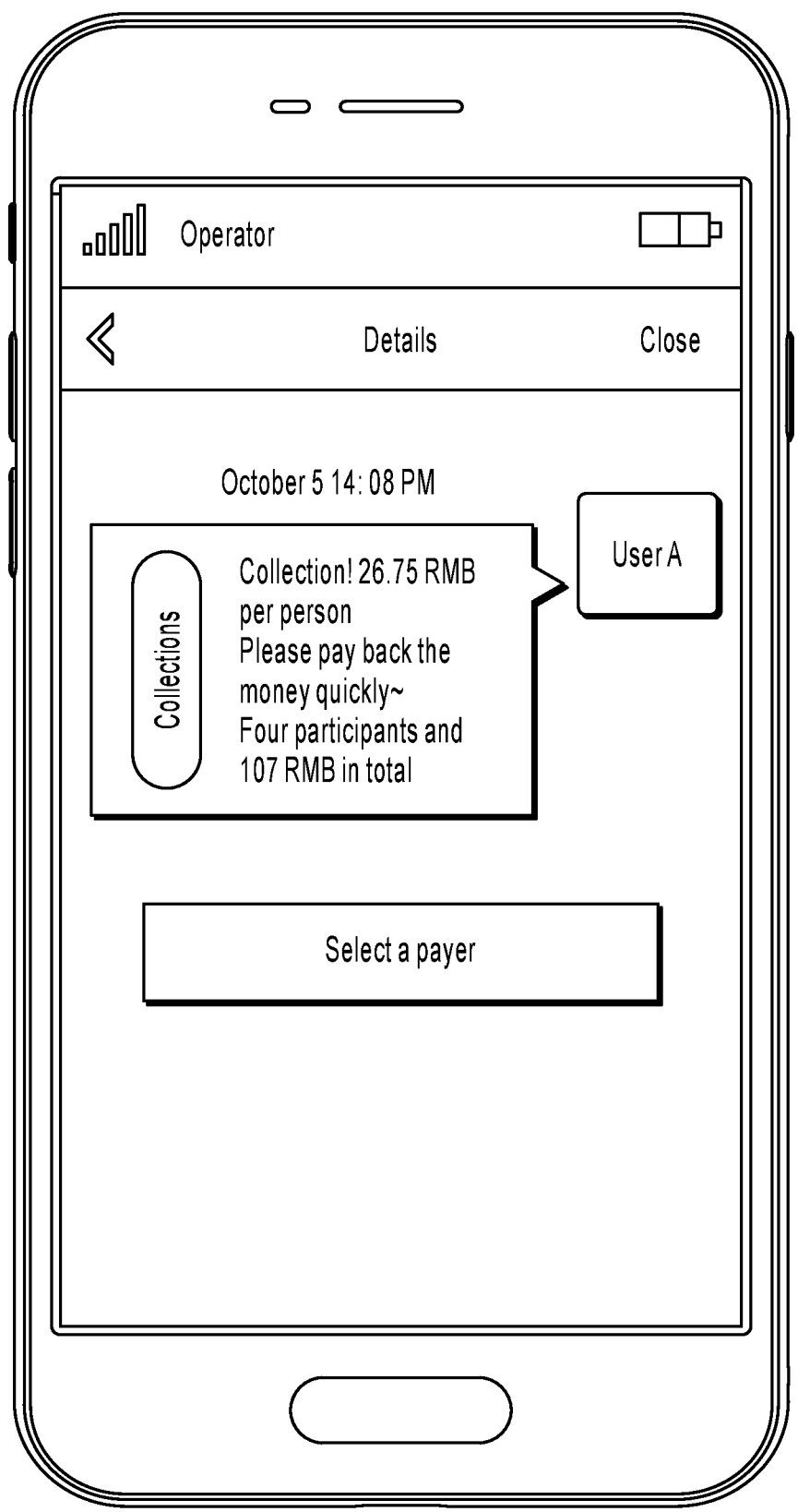
FIG. 8 is a schematic diagram illustrating a page of an implementation after a collection service is initiated, according to the present application.

In the present implementation of the present application, for example, the service item that is to be processed is an ongoing collection service, and the target object of the service item that is to be processed can include a corresponding payer. With reference to the previously described implementation of AA dinner, after entering a total amount and a total quantity of persons and tapping an OK button in FIG. 2, the user needs to send a request message of the collection service to a corresponding payer. Correspondingly, account information of the payer can be obtained as the target object of the service item that is to be processed. FIG. 8 is a schematic diagram illustrating a page of an implementation after a collection service is initiated, according to the present application. It can be seen from FIG. 8 that a user can tap a button of "select a payer" to send a request message of the collection service to a corresponding payer.

S720: Query whether received data sent by the target object exists within a predetermined time period.

In the present implementation of the present application, after the target object of the service item that is to be processed is determined, whether the received data sent by the target object exists within the predetermined time period can be queried. Specifically, the predetermined time period can include a time period predetermined based on a trigger time of the service item that is to be processed. Preferably, the predetermined time period includes at least one of the following time periods: a first time period before a generation time of the service item that is to be processed; a second time period after the generation time of the service item that is to be processed; a third time period before the generation time of the service item that is to be processed; or a fourth time period after the generation time of the service item that is to be processed.

In a specific implementation, the received data can include received transfer information, etc. For example, user X transfers 200 RMB to you.

S730: When a determining result is yes, set a second to-be-confirmed label for the received data sent by the target object.

In the present implementation of the present application, when the determining result in step S720 is yes, the second to-be-confirmed label can be set for the received data sent by the target object. Specifically, the second to-be-confirmed label can include predetermined labels that are in a one-to-one correspondence with corresponding service items that are to be processed.

S740: Display a second message confirmation interface, where the second message confirmation interface includes a confirmation message about whether to combine the received data that has the second to-be-confirmed label into the corresponding service item that is to be processed.

In the present implementation of the present application, the second message confirmation interface can be displayed. The second message confirmation interface includes the confirmation message about whether to combine the received data that has the second to-be-confirmed label into the corresponding service item that is to be processed. Specifically, the second message confirmation interface can include an interface that is predetermined based on the confirmation message about whether to combine the received data that has the second to-be-confirmed label into the corresponding service item that is to be processed.

In some implementations, before the displaying a second message confirmation interface, the method can further include the following: monitoring whether there is an operation instruction for entering a processing interface of the service item that is to be processed, and in response to detecting that the operation instruction for entering the processing interface of the service item that is to be processed, displaying the second message confirmation interface, where the second message confirmation interface includes the confirmation message about whether to combine the received data that has the second to-be-confirmed label into the corresponding service item that is to be processed.

In some implementations, the method can further include the following: when an execution result of the confirmation message is yes, combining the received data that has the second to-be-confirmed label into the service item that is to be processed.

In some implementations, the method can further include the following: when an execution result of the confirmation message is no, removing the label from the received data that has the second to-be-confirmed label.

It can be learned from the implementation of the method for processing service data in the present application that, in the present application, whether the received data sent by the target object of the service item that is to be processed exists within the predetermined time period is determined, the second to-be-confirmed label that is in a one-to-one correspondence with the corresponding service item that is to be processed is set for the received data sent by the target object, and then the second message confirmation interface that includes the confirmation message about whether to combine the received data that has the second to-be-confirmed label into the corresponding service item that is to be processed is displayed to help a user complete the service item that is to be processed. Further, a case in which a user performs service processing in another way instead of entering a service data payment processing interface can be effectively alleviated. Compared with the existing technology, the technical solutions provided in the implementations of the present application can help a user complete a service item that is to be processed, and can further release server resources, accelerate server processing speed, and improve user experience.

Figure 9:
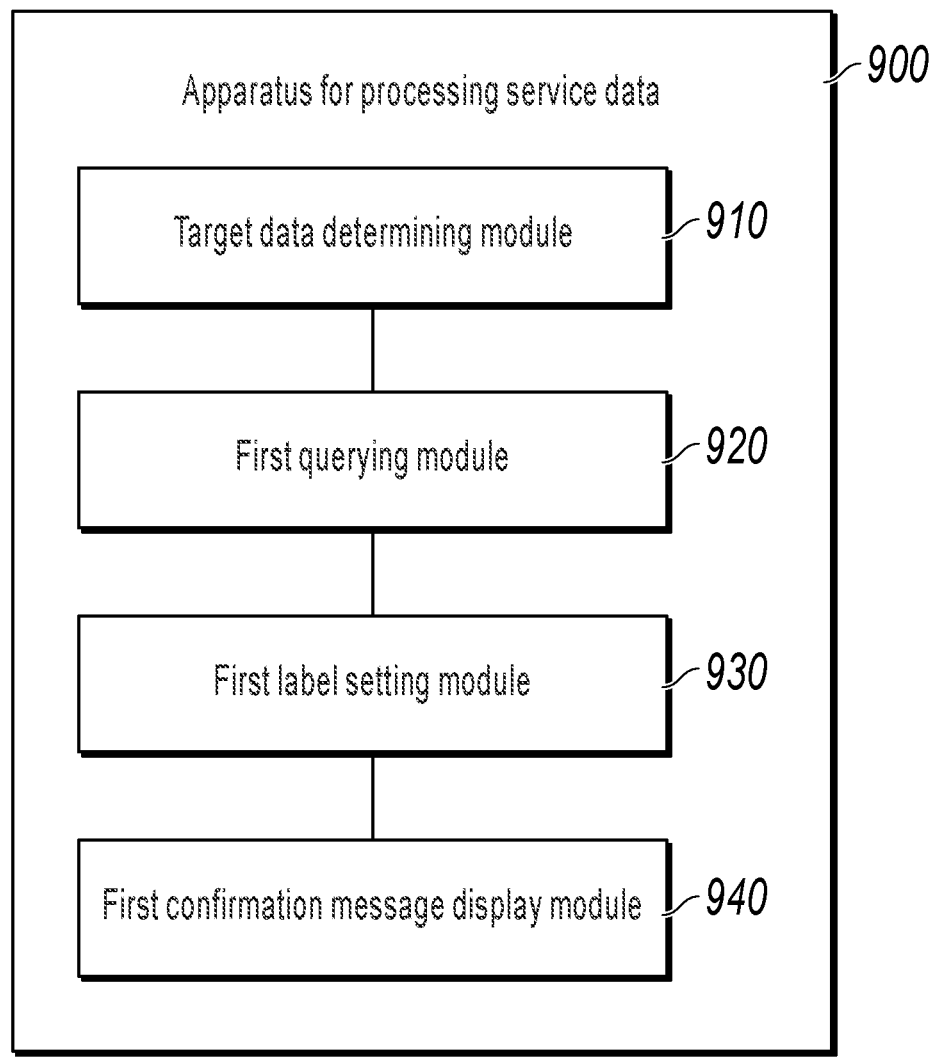
FIG. 9 is a schematic structural diagram illustrating an implementation of an apparatus for processing service data, according to the present application.

Another aspect of the present application further provides an apparatus for processing service data. FIG. 9 is a schematic structural diagram illustrating an implementation of an apparatus for processing service data, according to the present application. As shown in FIG. 9, the apparatus 900 can include a target data determining module 910, configured to determine target data of a service item that is to be processed; a first querying module 920, configured to query whether received data associated with the target data exists within a predetermined time period; a first label setting module 930, configured to set a first to-be-confirmed label for the received data associated with the target data when a result determined by the first querying module 920 is yes; and a first confirmation message display module 940, configured to display a first message confirmation interface, where the first message confirmation interface includes a confirmation message about whether to combine the received data that has the first to-be-confirmed label into the corresponding service item that is to be processed.

Figure 10:
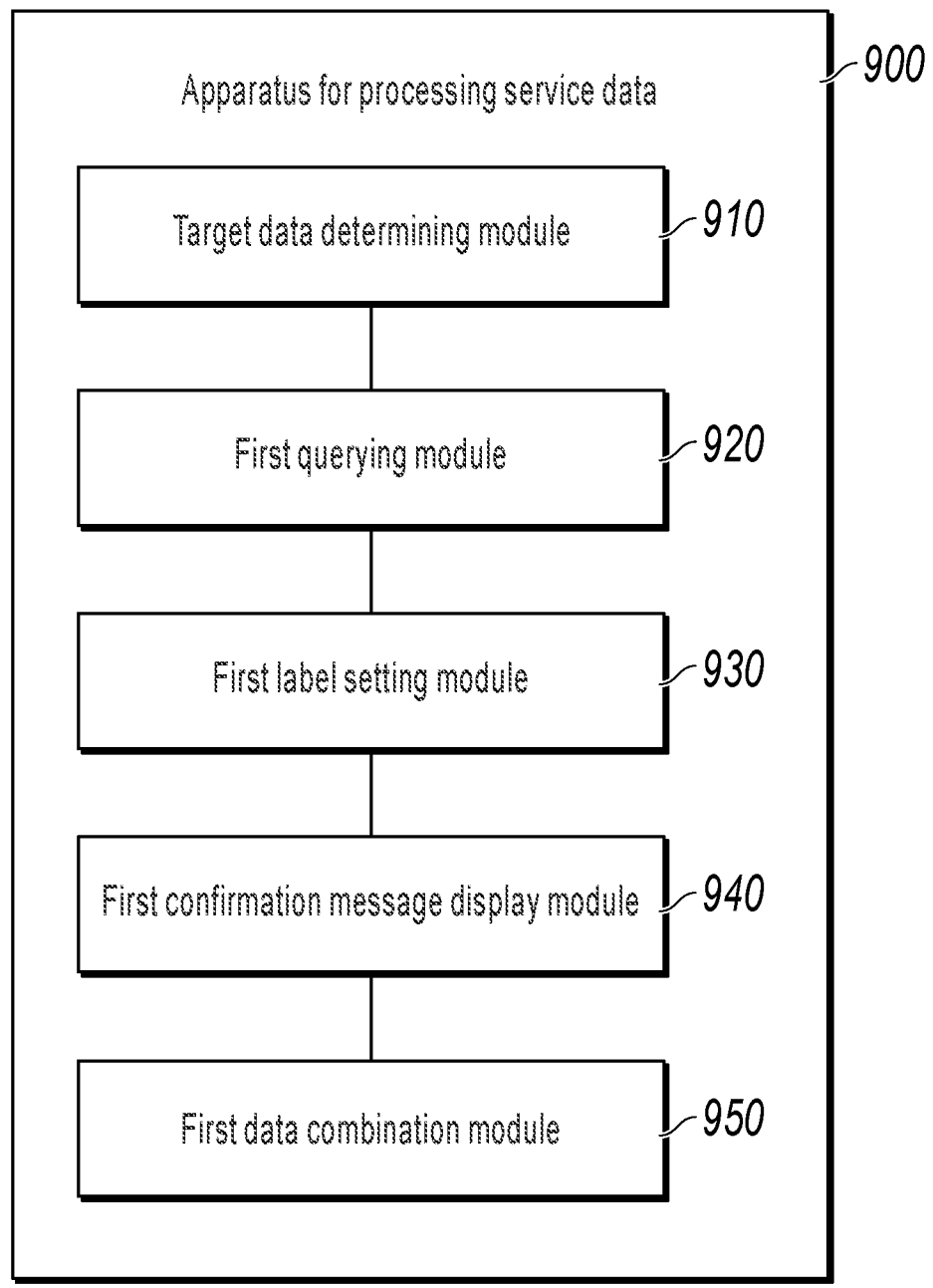
FIG. 10 is a schematic structural diagram illustrating another implementation of an apparatus for processing service data, according to the present application.

FIG. 10 is a schematic structural diagram illustrating another implementation of an apparatus for processing service data, according to the present application. As shown in FIG. 10, the apparatus 900 can further include a first data combination module 950, configured to combine the received data that has the first to-be-confirmed label into the service item that is to be processed when an execution result of the confirmation message is yes.

In another implementation, the apparatus 900 can further include a first label removal module, configured to remove the label from the received data that has the first to-be-confirmed label when an execution result of the confirmation message is no.

In another implementation, the apparatus can further include a first monitoring module, configured to monitor whether there is an operation instruction for entering a processing interface of the service item that is to be processed, where in response to detecting the operation instruction for entering the processing interface of the service item that is to be processed, the first message confirmation interface is displayed, and the first message confirmation interface includes the confirmation message about whether to combine the received data that has the first to-be-confirmed label into the corresponding service item that is to be processed.

In another implementation, the predetermined time period can include at least one of the following time periods: a first time period before a generation time of the service item that is to be processed; a second time period after the generation time of the service item that is to be processed; a third time period before the generation time of the service item that is to be processed; or a fourth time period after the generation time of the service item that is to be processed.

In another implementation, the received data associated with the target data can include at least one of the following: received data whose difference from the target data is less than or equal to a predetermined threshold; or received data that is in a multiple relationship with the target data.

Figure 11:
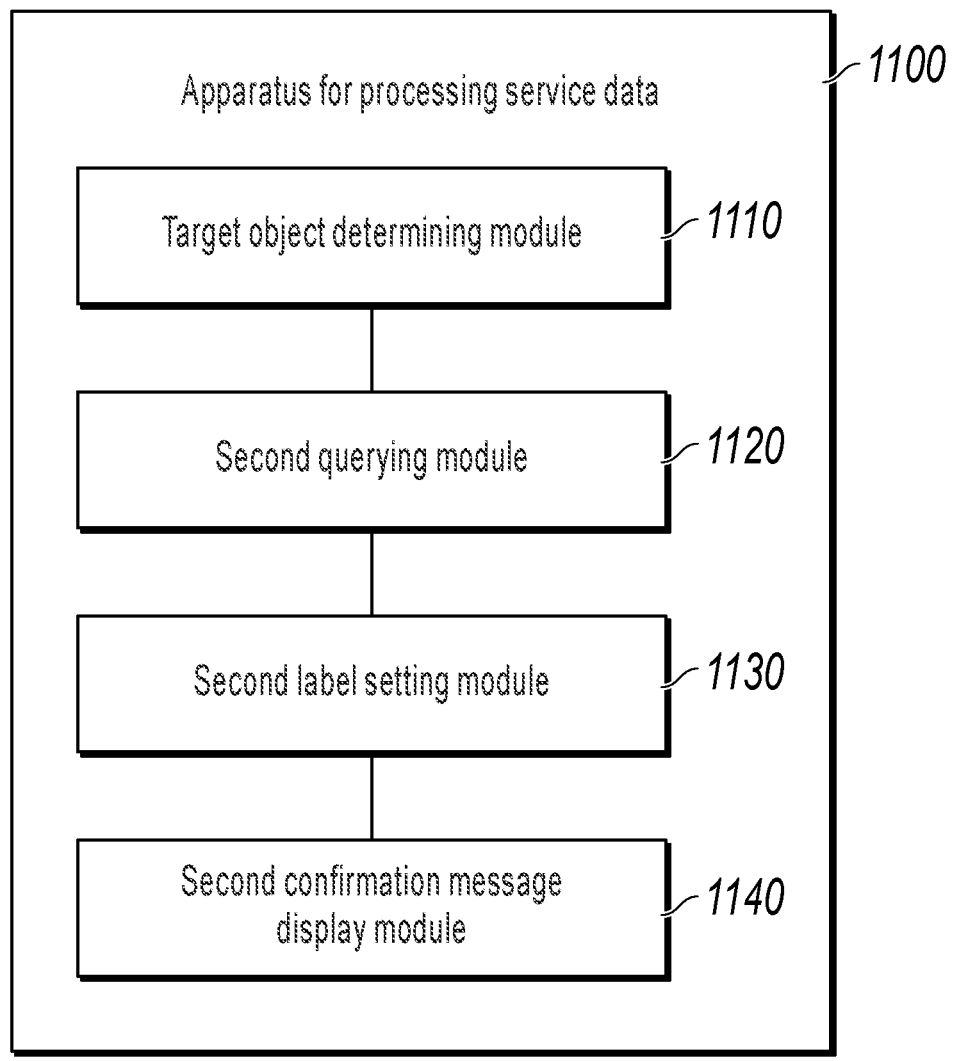
FIG. 11 is a schematic structural diagram illustrating another implementation of an apparatus for processing service data, according to the present application.

The present application further provides another implementation of an apparatus for processing service data. FIG. 11 is a schematic structural diagram illustrating another implementation of an apparatus for processing service data, according to the present application. As shown in FIG. 11, an apparatus 1100 can include a target object determining module 1110, configured to determine a target object of a service item that is to be processed; a second querying module 1120, configured to query whether received data sent by the target object exists within a predetermined time period; a second label setting module 1130, configured to set a second to-be-confirmed label for the received data sent by the target object when a result determined by the second querying module 1120 is yes; and a second confirmation message display module 1140, configured to display a second message confirmation interface, where the second message confirmation interface includes a confirmation message about whether to combine the received data that has the second to-be-confirmed label into the corresponding service item that is to be processed.

Figure 12:
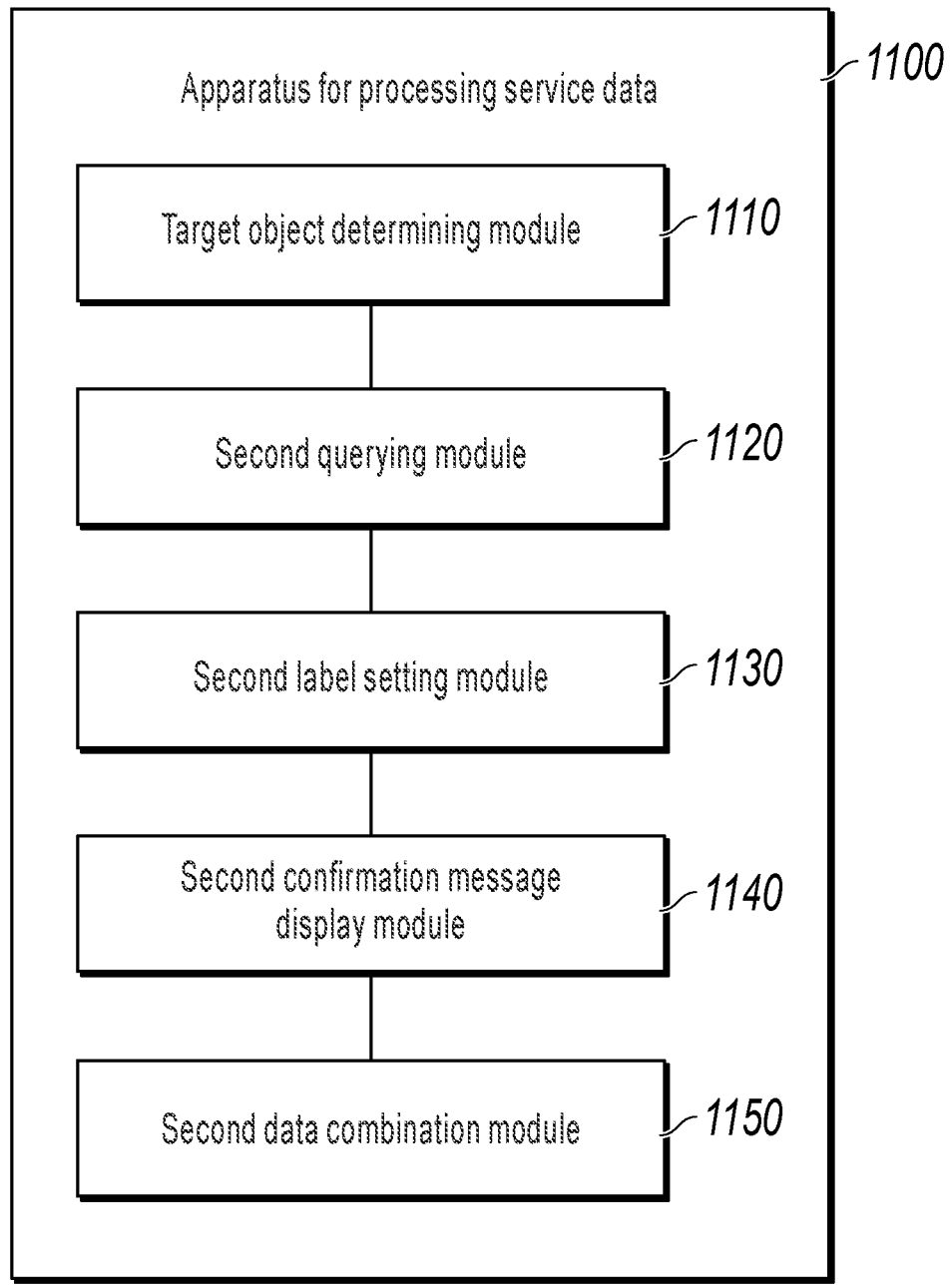
FIG. 12 is a schematic structural diagram illustrating another implementation of an apparatus for processing service data, according to the present application.

FIG. 12 is a schematic structural diagram illustrating another implementation of an apparatus for processing service data, according to the present application. As shown in FIG. 12, the apparatus 1100 can further include a second data combination module 1150, configured to combine the received data that has the second to-be-confirmed label into the service item that is to be processed when an execution result of the confirmation message is yes.

In another implementation, the apparatus 1100 can further include a second label removal module, configured to remove the label from the received data that has the second to-be-confirmed label when an execution result of the confirmation message is no.

In another implementation, the apparatus can further include a second monitoring module, configured to monitor whether there is an operation instruction for entering a processing interface of the service item that is to be processed, where in response to detecting the operation instruction for entering the processing interface of the service item that is to be processed, the second message confirmation interface is displayed, and the second message confirmation interface includes the confirmation message about whether to combine the received data that has the second to-be-confirmed label into the corresponding service item that is to be processed.

In another implementation, the predetermined time period can include at least one of the following time periods: a first time period before a generation time of the service item that is to be processed; a second time period after the generation time of the service item that is to be processed; a third time period before the generation time of the service item that is to be processed; or a fourth time period after the generation time of the service item that is to be processed.

Another aspect of the present application further provides an implementation of a client, where the client can include at least one processor; a memory storing programmed instructions, where the programmed instructions, when executed by the at least one processor, instruct the at least one processor to determine target data of a service item that is to be processed, query whether received data associated with the target data exists within a predetermined time period, set a first to-be-confirmed label for the received data associated with the target data when a determining result is yes, and send an instruction for displaying a first message confirmation interface, where the first message confirmation interface includes a confirmation message about whether to combine the received data that has the first to-be-confirmed label into the corresponding service item that is to be processed; and a display unit, coupled to the at least one processor, configured to display the first message confirmation interface when the processor detects an operation instruction for entering a processing interface of the service item that is to be processed, where the first message confirmation interface includes the confirmation message about whether to combine the received data that has the first to-be-confirmed label into the corresponding service item that is to be processed.

Figure 13:
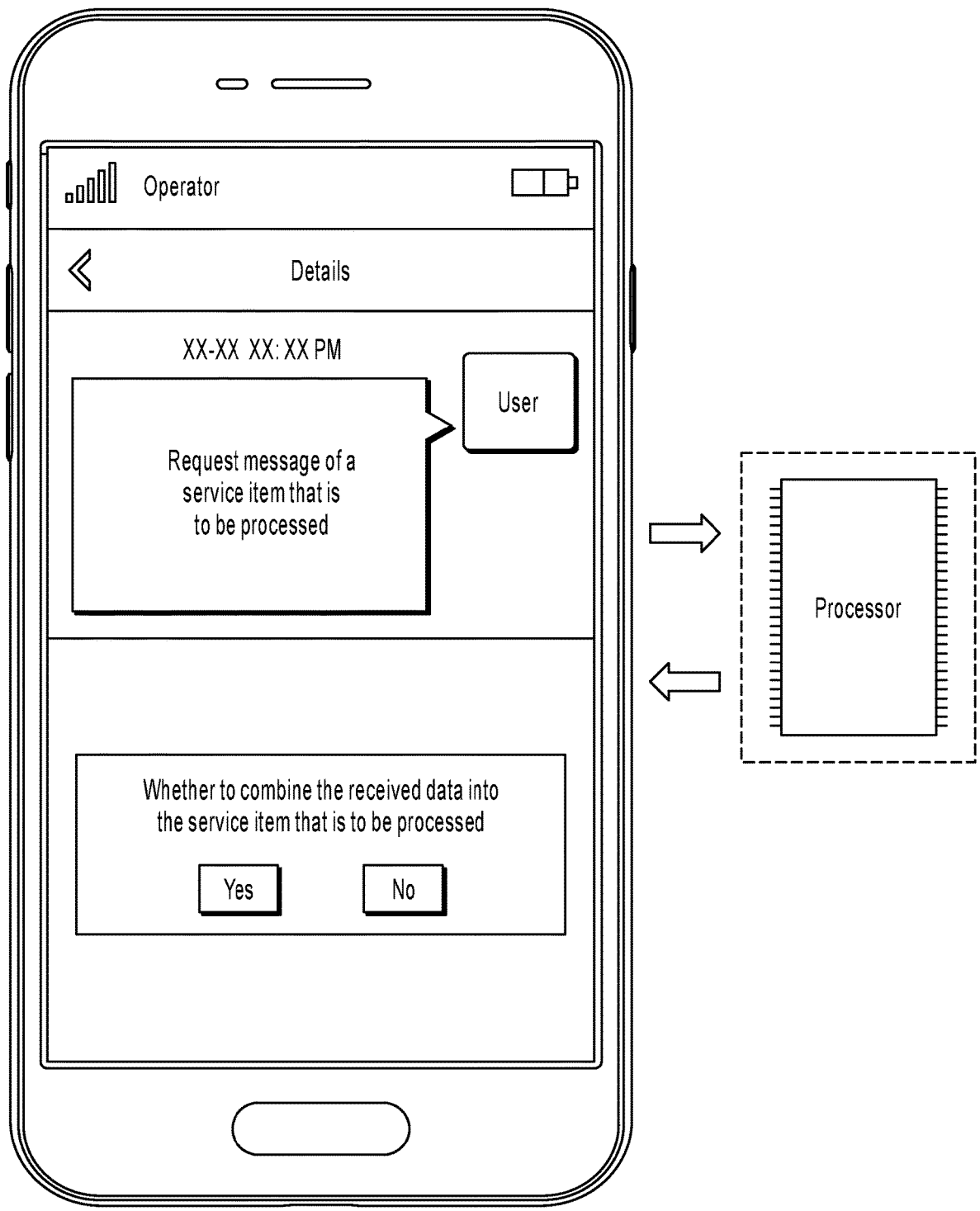
FIG. 13 is a schematic structural diagram illustrating an example implementation of a client, according to the present application.

FIG. 13 is a schematic structural diagram illustrating an example implementation of a client, according to the present application.

In another implementation, the client program instruction can further include the following: when an execution result of the confirmation message is yes, combining the received data that has the first to-be-confirmed label into the service item that is to be processed.

In another implementation, the client program instruction can further include the following: when an execution result of the confirmation message is no, removing the label from the received data that has the first to-be-confirmed label.

The present application further provides another implementation of a client, where the client can include at least one processor; a memory storing programmed instructions, wherein the programmed instructions, when executed by the at least one processor, instruct the at least one processor to determine a target object of a service item that is to be processed, query whether received data sent by the target object exists within a predetermined time period, set a second to-be-confirmed label for the received data sent by the target object when a determining result is yes, and send an instruction for displaying a second message confirmation interface, where the second message confirmation interface includes a confirmation message about whether to combine the received data that has the second to-be-confirmed label into the corresponding service item that is to be processed; and a display unit, coupled to the at least one processor, configured to display the second message confirmation interface when the processor detects an operation instruction for entering a processing interface of the service item that is to be processed, where the second message confirmation interface includes the confirmation message about whether to combine the received data that has the second to-be-confirmed label into the corresponding service item that is to be processed.

In another implementation, the client program instruction can further include the following: when an execution result of the confirmation message is yes, combining the received data that has the second to-be-confirmed label into the service item that is to be processed.

In another implementation, the client program instruction can further include the following: when an execution result of the confirmation message is no, removing the label from the received data that has the second to-be-confirmed label.

Specifically, in the present implementation of the present application, the processor can include a central processing unit (CPU), and certainly, can further include a single-chip microcomputer with a logic processing capability, a logic gate circuit, an integrated circuit, etc, or an appropriate combination of them. The display unit can include a mobile device display screen, a projection device, etc.

It can be learned from the implementations of methods, apparatuses, and client devices for processing service data in the present application that, in the present application, the received data related to the service item that is to be processed is determined, the label that is to be confirmed and that is in a one-to-one correspondence with the corresponding service item that is to be processed is set for the related received data, and then the message confirmation interface including the confirmation message about whether to combine the received data that has the label that is to be confirmed into the corresponding service item that is to be processed is displayed to help a user complete the service item that is to be processed. Further, a case in which a user performs service processing in another way instead of entering a service data payment processing interface can be effectively alleviated. Compared with the existing technology, the technical solutions provided in the implementations of the present application can help a user complete a service item that is to be processed, and can further release server resources, accelerate server processing speed, and improve user experience.

In the 1990s, whether technology improvement is hardware improvement (e.g., improvement of a circuit structure such as a diode, a transistor, or a switch) or software improvement (improvement of a method procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (e.g., a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). Currently, Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate way. For example, the controller can be a microprocessor, a processor, or a computer readable medium, a logic gate, a switch, an application-specific integrated circuit (ASIC), a programmable logic controller, or an embedded microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that a controller can be implemented by using a pure computer readable program code method, and the method steps can be logically programmed to enable the controller to implement the same functions in forms of a logic gate, a switch, an application-specific integrated circuit, a programmable logic controller, an embedded microcontroller, etc. Therefore, the controller can be considered as a hardware component, and an apparatus included in the controller and configured to implement various functions in the controller can also be considered as a structure in a hardware component. Alternatively, an apparatus configured to implement various functions can be considered as a software module that can implement the method or a structure in a hardware component.

The apparatuses and modules illustrated in the previous implementations can be implemented by using a computer chip or an entity, or can be implemented by using a product that has a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatuses are described by dividing the functions into various modules. Certainly, when the present application is implemented, the functions of each module can be implemented in one or more pieces of software and/or hardware.

A person skilled in the art should understand that an implementation of the present disclosure can be provided as a method, an apparatus, or a computer program product. Therefore, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk memory, a compact disc read-only memory (CD-ROM), and an optical memory) that include computer-usable program code.

The present disclosure is described with reference to the flowcharts and/or block diagrams of the method, the device (apparatus), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions can be stored in a computer readable memory that can instruct the computer or the other programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or the other programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory may include a non-persistent memory, a random access memory (RAM), and/or a non-volatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage or another magnetic storage device or any other non-transmission medium. The computer storage medium can be used to store information that can be accessed by a computing device. As described in the present specification, the computer readable medium does not include computer readable transitory media (transitory media) such as a modulated data signal and a carrier.

It is worthwhile to further note that the terms "include", "comprise", or their any other variants are intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes a . . . " does not, without more constraints, preclude the existence of additional identical elements in the process, method, article, or device that includes the element.

A person skilled in the art should understand that an implementation of the present application can be provided as a method, an apparatus, or a computer program product. Therefore, the present application can use a form of hardware only implementations, software only implementations, or implementations with a combination of software and hardware. In addition, the present application can use a form of a computer program product implemented on one or more computer-usable storage media (including but not limited to a magnetic disk memory, a compact disc read-only memory (CD-ROM), and an optical memory) that include computer-usable program code.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The implementations of the present specification are described in a progressive way. For same or similar parts in the implementations, references can be made to the implementations. Each implementation focuses on a difference from other implementations. Particularly, an apparatus or client implementation is basically similar to the method implementation, and therefore is described briefly. For related parts, references can be made to partial descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 14:
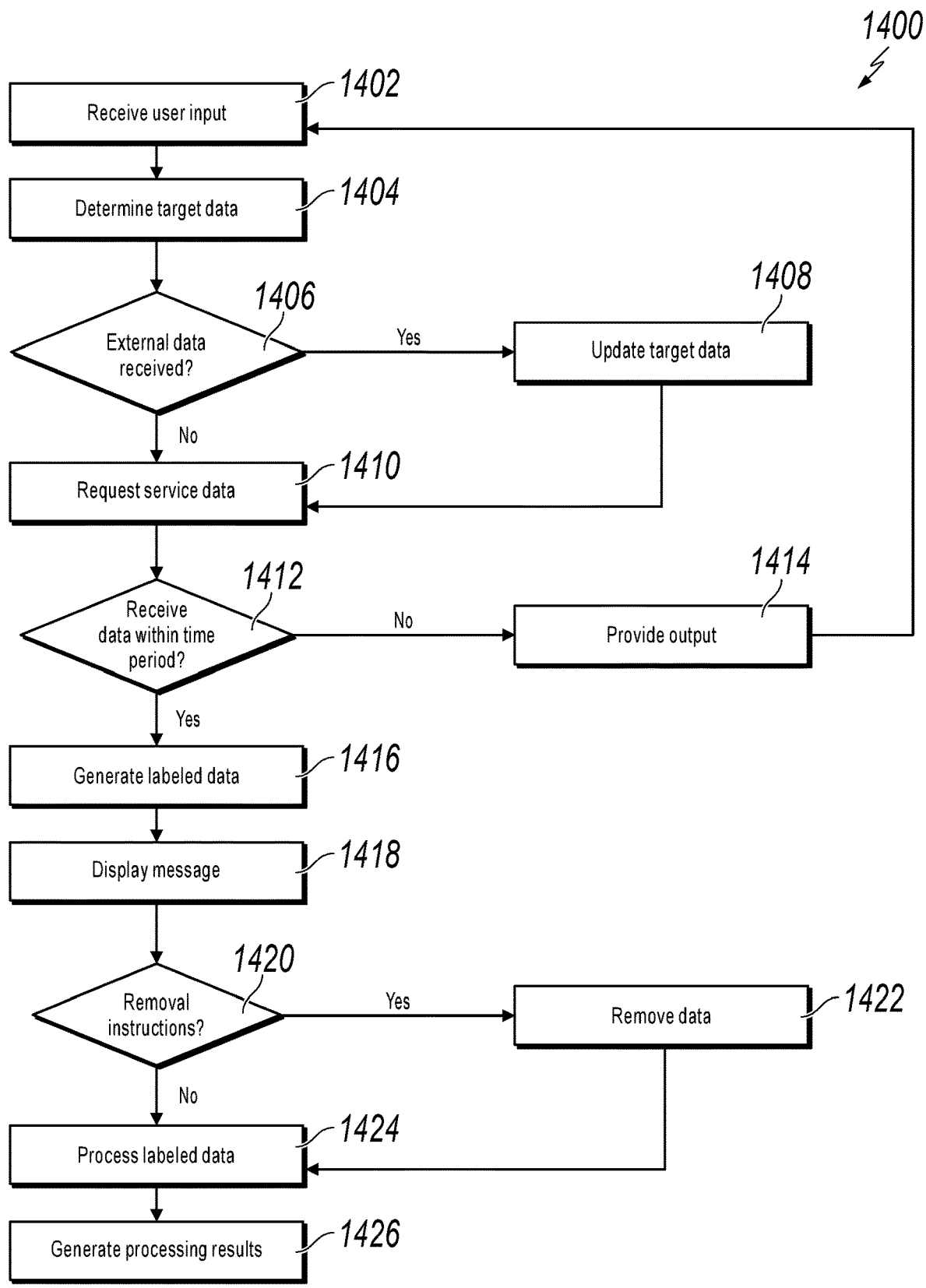
FIG. 14 is a flowchart illustrating an example of a computer-implemented method for processing service data, according to an implementation of the present disclosure.

FIG. 14 is a flowchart illustrating an example of a computer-implemented method 1400 for processing service data, according to an implementation of the present disclosure. For clarity of presentation, the description that follows generally describes method 1400 in the context of the other figures in this description. However, it will be understood that method 1400 can be performed, for example, by any system, environment, software, and hardware, or a combination of systems, environments, software, and hardware, as appropriate. In some implementations, various steps of method 1400 can be run in parallel, in combination, in loops, or in any order.

At 1402, a user input is received by a user device within a graphical user interface of a service application designed for processing a service item. The user input includes a request to process the service item using the service application. The user input can define object data associated with the service item. The object data can define a number of the target objects and can include identifiers associated to the target objects (e.g., client devices). In some implementations, the user device and the target objects communicate with each other using a global and/or a local network. For example, the user device and the target objects can transmit data to each other using any one of near field communication and internet connection. From 1402, method 1400 proceeds to 1404.

At 1404, target data is determined. In some implementations, determining the target data includes identification of the target objects of the service item that is to be processed and corresponding target data requests. In some implementations, determining the target data includes transmission of the target data requests to the corresponding target objects. Each of the target data requests can define particular service item features (e.g., amount, dimension, size, type, etc.) for each of the corresponding target objects. From 1404, method 1400 proceeds to 1406.

At 1406, a determination is made as to whether external service data is available. For example, a database is queried to determine whether external data associated with the service item was received from any of the identified target objects. The external service data can be transmitted by a target object prior to receiving the corresponding target data request. The external service data can be processed to determine whether it satisfies a condition for processing at least a portion of the service item. For example, it can be determined whether the external service data includes a feature that matches a service item feature defined by the corresponding target data request.

From 1406, if it is determined that an external service data matches the service item request, method 1400 proceeds to 1408. At 1408, in response to determining that the external service data corresponds to one of multiple target objects and satisfies the processing condition, the target data is updated. Updating the target data can include removal of the target object from the target object list and adjustment of the service item requests. From 1408, method 1400 proceeds to 1410.

Otherwise, if it is determined that no external service data matches the service item request, method 1400 proceeds to 1410. At 1410, service item requests are transmitted to the (updated) target objects. Service data associated with the (updated) target data is received from multiple target objects. In some implementations, the service data is encrypted using a pre-established encryption protocol that secures data privacy. The service data can include service data including a feature different from the corresponding requested service item feature, the feature difference being less than or equal to a predetermined threshold (e.g., a percentage of the feature or a set threshold independent of the particular feature). The service data can include service data that is in a multiple relationship with the target data. The multiple relationship can define service data received from one of the target objects that includes a feature that matches a summation of requested service item features from two or more target objects from the target object list. From 1410, method 1400 proceeds to 1412.

At 1412, a determination is made as to whether the received service data is within a predetermined time period. The predetermined time period can be a first time interval before the request for the service item that is to be processed was transmitted to the target objects. The predetermined time period can be a second time interval after the request for the service item that is to be processed was transmitted to the target objects.

From 1412, if it is determined that the service data is outside the predetermined time period, method 1400 proceeds to 1414. At 1414, an output is provided. For example, an alert is generated that the service data is outside the predetermined time period. From 1414, method 1400 returns to 1402.

Otherwise, if it is determined that the service data is within the predetermined time period, method 1400 proceeds to 1416. At 1416, labeled data is generated. The labeled data can include the service data and a confirmation label. From 1416, method 1400 proceeds to 1418.

At 1418, labeled data is displayed in a confirmation interface of the service application. The confirmation interface can be configured to enable a user to provide a user input to confirm complete or partial service processing. For the complete service processing, the confirmation interface provides an option to process in parallel the labeled data associated with the target objects. For the partial service processing, the confirmation interface provides an option to remove one or more labeled data associated with particular target objects from service processing. In some implementations, the service application can be configured to automatically complete service processing if a user input is not provided within a particular time threshold from the moment the labeled data was displayed. The confirmation interface can be configured to display the countdown until automatic completion of service processing.

In some implementations, displaying the labeled data includes displaying the service data with the matching information item label in a dynamic list. The display of the dynamic list can be automatically modified to display a relative brightness of the service data item. In some implementations, any of the service data in the dynamic list with labels matching a particular item feature or the target label, can be presented at a relatively higher brightness level than other service data items that do not match the item feature or the target label. In some instances, matching service data can be made brighter, while in other instances, non-matching service data can be made darker. In some of those instances, matching service data can be made brighter while non-matching service data can be made darker, or can be shaded. In other instances, matching service data may be modified to a particular color signifying or associated with a particular information label.

In some implementations, displaying the service data with the matching information item label in the dynamic list can include hierarchically displaying the service data item with the matching information item label so that the service data item is displayed in an upper portion of the dynamic list used to present service data matching a particular target label. In such instances, the dynamic list may include a first portion and a second portion, where the first portion is reserved for service data with labels that match the target labels of the service item. In some instances, the first portion may be an upper portion of the dynamic list when the list is presented from top to bottom. In some instances, the upper portion may include space, or may be expanded to include, a predetermined number of information items for presentation. From 1418, method 1400 proceeds to 1420.

At 1420, a determination is made as to whether the user input includes removal instructions of one or more labeled data associated with particular target objects from service processing.

From 1420, if it is determined that the user input includes removal instructions, method 1400 proceeds to 1422. At 1422, the identified one or more labeled data associated with particular target objects from service processing are removed from the data to be processed. From 1422, method 1400 proceeds to 1424.

Otherwise, if it is determined that the user input does not include removal instructions, method 1400 proceeds to 1424. At 1424, the labeled data or the remaining labeled data are processed to complete the service of the item. From 1424, method 1400 proceeds to 1426.

At 1426, a processing result (e.g., a confirmation of completion of the service item process) is displayed on the graphical user interface of the service application and processing results corresponding to the target objects are generated and transmitted to each of the target objects. After 1426, method 1400 can stop.

Implementations of the present application can solve technical problems in processing service data involving multiple target objects. The devices and system used for service processing are configured to enable parallel processing of portions of target data and service data corresponding to multiple target objects in parallel, which increases the overall processing speed. In some implementations, the parallel processes can be configured to be completed independent from each other, such that failure of communication or failure of data transmission between the user device and one of the target objects does not affect (e.g., stop) completion of the parallel processes.

In consideration of security and confidentiality, target data and service data can be configured to perform privacy protection processing on the data associated with the service item before generating the target data or processing the service data. In some implementations, the service data is stored in a database accessible by the user device in an encrypted form. Such security measures ensure that that service data is not corrupted or altered by malicious processes. For example, an alteration of an asset-receiving object can be a tactic used by an attacker when a target user is compromised for fraudulent purposes, and storage of service data in an immutable database can prevent the use of that tactic by an attacker. In addition, the data transfer operation is configured such that it does not affect the overall data volume within the database by deleting a data volume associated with an older service item when a storage time or amount is reached or before adding newer data corresponding to a newer service item. As such, the service processing operation does not lead to an exponential increase of data volume, which is a common problem associated with conventional methods of service management.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for processing service data, the computer-implemented method comprising:

receiving, by one or more processors, a first user input of a first user comprising a first request indicating target data for a service of a plurality of collection services and identifiers of a plurality of target objects that are users of the service, the target data comprising a service currency value corresponding to the-service used by the target objects;

receiving, by the one or more processors and from the plurality of target objects, service data comprising at least a portion of the target data;

determining, by the one or more processors, whether the service data was received within a predetermined time period relative to a trigger time of the service;

in response to determining that the service data was received within the predetermined time period, generating, by the one or more processors, labeled data comprising the service data and a plurality of confirmation labels corresponding to a respective service of the plurality of collection services used by the target objects, the confirmation labels comprising an indicator of a second request for a confirmation prior to processing the service data;

displaying, by the one or more processors, a message confirmation interface, that comprises a first group and one or more additional groups, wherein the first group comprises a portion of the plurality of target objects having the labeled data in a one-to-one correspondence with the service currency value, the one or more additional groups comprise a confirmation message providing an option to combine the labeled data associated of one or more target objects of the plurality of target objects excluded from the portion of the plurality of target objects with the first group, the message confirmation interface enabling initiation of parallel processing of the labeled data within the first group; and receiving, by the one or more processors, a second user input of the first user comprising a command to process in parallel the labeled data within the first group.

2. The computer-implemented method of claim 1, comprising:

removing at least one of the plurality of confirmation labels from a first portion of the labeled data to generate unlabeled data and remaining labeled data.

3. The computer-implemented method of claim 2, comprising:

processing the remaining labeled data to retrieve a service reimbursement.

4. The computer-implemented method of claim 1, comprising:

receiving external service data associated with the service;

determining whether the external service data corresponds to one of the plurality of target objects; and in response to determining that the external service data corresponds to one of the plurality of target objects, updating the target data.

5. The computer-implemented method of claim 1, wherein the predetermined time period comprises at least one of:

a first time period before a generation time of the service, the generation time indicating a time corresponding to a generation of the service; and a second time period after the generation time of the service.

6. The computer-implemented method of claim 1, wherein the service data comprises at least one of:

first service data comprising a first service currency value that is less than or equal to a predetermined threshold relative to a target value of the target data; and second service data comprising a second service currency value that is a sum of a plurality of target values of the target data.

7. The computer-implemented method of claim 1, further comprising:

receiving a user input comprising a third request to process the service, wherein the user input comprises object data associated with the service, the object data comprising the plurality of target objects and a plurality of target object identifiers.

8. A non-transitory, computer-readable medium coupled to one or more processors and having instructions stored thereon which, when executed by the one or more processors, cause the one or more processors to perform operations for processing service data, the operations comprising:

receiving, by one or more processors, a first user input of a first user comprising a first request indicating target data for a service of a plurality of collection services and identifiers of a plurality of target objects that are users of the service, the target data comprising a service currency value corresponding to the-service used by the target objects;

receiving, by the one or more processors and from the plurality of target objects, service data comprising at least a portion of the target data;

determining, by the one or more processors, whether the service data was received within a predetermined time period relative to a trigger time of the service;

in response to determining that the service data was received within the predetermined time period, generating, by the one or more processors, labeled data comprising the service data and a plurality of confirmation labels corresponding to a respective service of the plurality of collection services used by the target objects, the confirmation labels comprising an indicator of a second request for a confirmation prior to processing the service data;

displaying, by the one or more processors, a message confirmation interface, that comprises a first group and one or more additional groups, wherein the first group comprises a portion of the plurality of target objects having the labeled data in a one-to-one correspondence with the service currency value, the one or more additional groups comprise a confirmation message providing an option to combine the labeled data associated of one or more target objects of the plurality of target objects excluded from the portion of the plurality of target objects with the first group, the message confirmation interface enabling initiation of parallel processing of the labeled data within the first group; and receiving, by the one or more processors, a second user input of the first user comprising a command to process in parallel the labeled data within the first group.

9. The non-transitory, computer-readable medium of claim 8, comprising:

removing at least one of the plurality of confirmation labels from a first portion of the labeled data to generate unlabeled data and remaining labeled data.

10. The non-transitory, computer-readable medium of claim 9, comprising:

processing the remaining labeled data to retrieve a service reimbursement.

11. The non-transitory, computer-readable medium of claim 8, comprising:

receiving external service data associated with the service;

determining whether the external service data corresponds to one of the plurality of target objects; and in response to determining that the external service data corresponds to one of the plurality of target objects, updating the target data.

12. The non-transitory, computer-readable medium of claim 8, wherein the predetermined time period comprises at least one of:

a first time period before a generation time of the service, the generation time indicating a time corresponding to a generation of the service; and a second time period after the generation time of the service.

13. The non-transitory, computer-readable medium of claim 8, wherein the service data comprises at least one of:

first service data comprising a first service currency value that is less than or equal to a predetermined threshold relative to a target value of the target data; and second service data comprising a second service currency value that is a sum of a plurality of target values of the target data.

14. The non-transitory, computer-readable medium of claim 8, further comprising:

receiving a user input comprising a third request to process the service, wherein the user input comprises object data associated with the service, the object data comprising the plurality of target objects and a plurality of target object identifiers.

15. A computer-implemented system for processing service data, the system comprising:

one or more computers; and one or more computer memory devices interoperably coupled with the one or more computers and having tangible, non-transitory, machine-readable media storing one or more instructions that, when executed by the one or more computers, perform one or more operations comprising:

receiving a first user input of a first user comprising a first request indicating target data for a service of a plurality of collection services and identifiers of a plurality of target objects that are users of the service, the target data comprising a service currency value corresponding to the-service used by the target objects, receiving, from the plurality of target objects, service data comprising at least a portion of the target data, determining whether the service data was received within a predetermined time period relative to a trigger time of the service, in response to determining that the service data was received within the predetermined time period, generating labeled data comprising the service data and a plurality of confirmation labels corresponding to a respective service of the plurality of collection services used by the target objects, the confirmation labels comprising an indicator of a second request for a confirmation prior to processing the service data, displaying a message confirmation interface, that comprises a first group and one or more additional groups, wherein the first group comprises a portion of the plurality of target objects having the labeled data in a one-to-one correspondence with the service currency value, the one or more additional groups comprise a confirmation message providing an option to combine the labeled data associated of one or more target objects of the plurality of target objects excluded from the portion of the plurality of target objects with the first group, the message confirmation interface enabling initiation of parallel processing of the labeled data within the first group, and receiving a second user input of the first user comprising a command to process in parallel the labeled data within the first group.

16. The computer-implemented system of claim 15, comprising:

removing at least one of the plurality of confirmation labels from a first portion of the labeled data to generate unlabeled data and remaining labeled data; and processing the remaining labeled data to retrieve a service reimbursement.

17. The computer-implemented system of claim 15, comprising:

receiving external service data associated with the service;

determining whether the external service data corresponds to one of the plurality of target objects; and in response to determining that the external service data corresponds to one of the plurality of target objects, updating the target data.

18. The computer-implemented system of claim 15, wherein the predetermined time period comprises at least one of:

a first time period before a generation time of the service, the generation time indicating a time corresponding to a generation of the service; and a second time period after the generation time of the service.

19. The computer-implemented system of claim 15, wherein the service data comprises at least one of:

first service data comprising a first service currency value that is less than or equal to a predetermined threshold relative to a target value of the target data; and second service data comprising a second service currency value that is a sum of a plurality of target values of the target data.

20. The computer-implemented system of claim 15, further comprising:

receiving a user input comprising a third request to process the service, wherein the user input comprises object data associated with the service, the object data comprising the plurality of target objects and a plurality of target object identifiers.

* * * * *

UNITED STATES PATENT AND TRADEMARK OFFICE
CERTIFICATE OF CORRECTION

PATENT NO. : 10,831,740 B2
APPLICATION NO. : 16/426928
DATED : November 10, 2020
INVENTOR(S) : Lindong Liu It is certified that error appears in the above-identified patent and that said Letters Patent is hereby corrected as shown below:

In the Claims

Column 22, Line 23, in Claim 1, delete "the-service" and insert -- the service --, therefor.

Column 23, Line 41, in Claim 8, delete "the-service" and insert -- the service --, therefor.

Column 24, Line 64, in Claim 15, delete "the-service" and insert -- the service --, therefor.

Signed and Sealed this
Nineteenth Day of January, 2021

Andrei Iancu
*Director of the United States Patent and Trademark Office*